United States Patent
Baker et al.

(10) Patent No.: US 6,202,413 B1
(45) Date of Patent: Mar. 20, 2001

(54) MULTIPLE NOZZLE EJECTOR FOR WASTEGATED TURBOMACHINERY

(75) Inventors: Glenn L. Baker, Columbus, IN (US); Gregory H. Henderson, Lexington, TN (US); P. Douglas Free, Columbus, IN (US)

(73) Assignee: Cummins Engine Company, Inc., Columbus, IN (US)

( * ) Notice: Subject to any disclaimer, the term of this patent is extended or adjusted under 35 U.S.C. 154(b) by 0 days.

(21) Appl. No.: 09/244,048

(22) Filed: Feb. 4, 1999

(51) Int. Cl.[7] ................................................. F02D 23/00
(52) U.S. Cl. ............................................. 60/602; 415/145
(58) Field of Search ................................ 60/602; 415/145

(56) References Cited

U.S. PATENT DOCUMENTS

| | | |
|---|---|---|
| 3,994,620 | 11/1976 | Spraker, Jr. et al. . |
| 4,463,564 | 8/1984 | McInerney . |
| 4,622,816 | 11/1986 | Boudigues . |
| 4,807,439 | 2/1989 | Hain et al. . |
| 5,052,362 | 10/1991 | Jenny et al. . |
| 5,311,749 | 5/1994 | McAuliffe et al. . |
| 5,417,068 | 5/1995 | Olofsson . |
| 5,579,643 | 12/1996 | McEwen et al. . |

FOREIGN PATENT DOCUMENTS

| | | |
|---|---|---|
| 0034765 | 9/1981 | (EP) . |
| 54-19007 | 2/1979 | (JP) . |
| 55-25505 | 2/1980 | (JP) . |
| 8907194 | 8/1989 | (WO) . |

OTHER PUBLICATIONS

Kenneth C. Cornelius et al., "Multiple Hole Ejector Performance with Short Wide Angle Diffusers," *Journal of Propulsion and Power*, vol. 10, No. 3, May–Jun. 1994, pp. 369–376.

Shigeru Anada et al., "Development of SJ (Swirl Jet) Turbocharger for Diesel Engine Vehicles," SAE Technical Paper No. 970341, 1997.

*Primary Examiner*—Noah P. Kamen
(74) *Attorney, Agent, or Firm*—Nixon Peabody LLP; Charles M. Leedom; Donald R. Studebaker

(57) ABSTRACT

An improved wastegated turbocharger including ejector nozzles such that the bypassed exhaust flow re-enters the main exhaust flow at a predetermined pitch angle and yaw angle so as to create a drop in turbine back pressure. The exhaust gas turbocharger includes a turbine housing having a turbine chamber, an exhaust housing portion, and an exhaust gas inlet to said turbine chamber wherein a turbine wheel is rotatably mounted in the turbine chamber and is rotatably responsive to exhaust gas flow from the exhaust gas inlet. In one embodiment, an outlet insert is provided which is rigidly attached to the exhaust housing portion and extends toward the turbine chamber thereby defining a bypass chamber and providing an exhaust gas outlet. A bypass flow passage which fluidly connects the exhaust gas inlet with the bypass chamber is also provided. The outlet insert includes a plurality of ejector nozzles for directing exhaust flow from the bypass chamber to the exhaust gas outlet. In another embodiment, an ejector nozzle ring with plurality of ejector nozzles is positioned between the turbine chamber and the outlet insert.

9 Claims, 5 Drawing Sheets

MULTIPLE NOZZLE EJECTOR FOR WASTEGATED TURBOMACHINERY

BACKGROUND OF THE INVENTION

1. Field of the Invention

The present invention is related to the field of wastegated turbomachinery such as turbochargers. More specifically, the invention relates to such wastegated turbochargers where the bypassed exhaust gas is returned to the main exhaust flow through an ejector nozzle.

2. Description of Related Art

Turbochargers have been commonly applied to internal combustion engines and their benefits of improving engine performance and reducing emissions is generally known in the art. In such applications, the exhaust gas of the internal combustion engine is routed to a turbine wheel where the energy of the exhaust gas is used to rotate the turbine wheel within its housing. The turbine wheel is fixedly connected to a compressor by a shaft causing the compressor to rotate and compress the intake charge. This compressed charge is routed to the intake manifold of the engine and thus, is provided to the engine cylinders during the intake cycle. The compressed intake charge improves the performance and the efficiency of the engine. Turbochargers are also generally provided with a wastegate which diverts at least a portion of the exhaust gas thereby providing a bypassed flow which circumvents the turbine wheel. Thus, the wastegate limits the amount of exhaust gas directed to the turbine wheel thereby controlling turbine wheel over-speed and the maximum boost pressure provided by the compressor. In conventional wastegated turbocharger designs, the bypassed flow generally passes through a poppet valve located just upstream of the turbine wheel and re-enters the main exhaust flow immediately downstream of the turbine wheel.

It has been found that this re-entry of the bypassed flow into the main exhaust flow in conventional wastegate designs diminishes the engine's theoretical efficiency in two distinct ways. First, the bypassed flow possesses wasted energy which is not harnessed or utilized by the turbocharger. Secondly, the main exhaust flow exiting the turbine wheel is disrupted when the bypassed flow re-enters the main exhaust flow. This disruption increases the turbine back pressure and the engine's back pressure which correspondingly reduces the efficiency of the turbocharger thereby diminishing the efficiency of the engine.

Attempts have been made to address the above identified problem of flow disruption and the resulting increased back pressure. In minimizing the main flow disruption, it has been also recognized in the art that in theory, the re-entering bypassed gas may be used to actually reduce the engine back pressure thereby increasing the engine's performance and efficiency. More specifically, it has been suggested in the art that this reduction in engine back pressure can be accomplished by having the bypassed flow re-enter the main exhaust flow through an ejector. Such flow would create an ejector effect which is a localized region of decreased pressure. This ejector effect will, in essence, reduce the pressure of the main exhaust flow when the bypassed flow re-enters the main flow and consequently, reduce the back pressure on the engine. Such reduction in back pressure will increase the turbocharger's performance and efficiency thereby increasing the performance and efficiency of the engine. Furthermore, some prior art references have specifically proposed various ejector designs that may be used in attempting to attain the desired ejector effect when the bypassed flow re-enters the main turbine exhaust flow.

For example, one reference that discusses the ejector effect of bypassed flow in a turbocharger is exemplified in U.S. Pat. No. 4,463,564 to McInerney that discloses a turbocharger with a bypass passage in the turbine housing and a wastegate which provides an exhaust ejector for reducing back-pressure on the engine. More specifically, the McInerney reference discloses a swing-type wastegate valve and bypass passage configured to inject the bypassed exhaust gases angularly and at a relatively high velocity into the exhaust passage such that the bypassed flow tends to draw gases from the turbine wheel thereby reducing back pressure. However, efficient ejectors are very difficult to design and consequently, it has been found that no significant ejector effect is likely to occur with simple bypass passages such as those disclosed in McInerney.

Alternative ejector designs are also disclosed in the Japanese Patent No. 55-25505 to Sato et al. which shows a turbocharger where the bypassed flow is jetted from an annular slit provided downstream of the turbine. The reference further discloses that the outlet static pressure of the turbine is thereby reduced and the output of the engine is increased. A similar ejector design is disclosed in the European Patent No. 0034765 to Behnert et al. which shows a turbocharger with an annular chamber formed around the turbine outlet such that the bypassed flow re-enters the main exhaust gas flow from the annular chamber with a swirling motion. This reference postulates that the swirling motion reduces the static pressure which results in an increase in the turbine speed. Another alternative design is shown in International patent application WO 89/07194 to Baretzky which discloses a turbine with a bypass channel including outlet openings with a radial slot shape which open into a turbine outlet in the direction of the exhaust gases flowing through the turbine outlet and tangent to the direction of turbine rotation. The reference discloses that the bypassed flow exerts an ejector effect on the exhaust gases, thereby reducing the pressure behind the turbine.

An ejector design including an annular ring jet similar to those discussed above has been tested by Aisin Seiki as disclosed in SAE paper "Development of SJ (Swirl Jet) Turbocharger for Diesel Engine Vehicles" (1997). The reference discloses a wastegated turbocharger in which the bypassed flow re-enters the main exhaust gas flow through an annular "swirl jet" which induces a swirling effect on the re-entering bypassed flow. The reference reports the test results concluding that the combined effect of reduced flow disruption and the "swirl jet", gave a reduction of 8.5 KPa (2.5 in-Hg) in the back pressure at high engine speeds.

However, it has been found that no significant ejector effect is likely to occur with all these annular ring type outlet designs because any tendency to reduce pressure by the re-entering bypassed flow is mostly negated by the main exhaust flow moving upstream, along the exhaust centerline, toward the low pressure region temporarily caused by the annular ring outlet designs. Thus, it has been found that the small amount of pressure reduction realized in the Aisin Seiki swirl jet design is attributable to reducing the disruption of the main exhaust flow caused when the bypassed flow is re-introduced into the main exhaust flow and that the annular ring type outlet designs do not produce a significant ejector effect.

It should be apparent from the above discussion and the prior art that efficient ejectors are very difficult to design. Although various designs have been proposed in the rior art, none of the prior art references claim to have obtained a pressure reduction significantly beyond that which is expected for minimizing the disruption effect. As discussed above, the swirl jets and the annular ring outlet designs were effective in reducing the disruption of the main exhaust flow thereby minimizing the increase in turbine exhaust pressure. However, these designs have been found to be inefficient in creating any significant ejector effect which can actually reduce turbine back pressure. In fact, none of the above noted prior art references disclose an effective ejector design that will actually reduce the turbine back pressure thereby increasing engine performance and efficiency.

Therefore, despite the progress made in the art in recognizing the potential benefits of an ejector effect in the re-entry of the bypassed flow, there is no known ejector design that can attain the ejector effect in a turbocharger. Thus, there exists an unfulfilled need for an ejector design for use in a turbocharger that is effective in reducing the turbine back pressure. Furthermore, there also exists an unfulfilled need for such an ejector design which is cost effective and easy to manufacture.

SUMMARY OF THE INVENTION

In view of the foregoing, it is an object of the present invention to provide an improved turbocharger which will increase the performance of the engine.

A second object of the present invention is to provide an improved turbocharger including a wastegate with ejector nozzles that enable the bypassed flow to re-enter the main exhaust flow.

A third object of the present invention is to provide a wastegated turbocharger including a plurality of ejector nozzles designed to minimize the increase in turbine back pressure by minimizing the disturbance of the main exhaust flow.

Yet another object of the present invention is to provide a wastegated turbocharger where the bypassed exhaust flow re-enters the main exhaust flow pressure through a plurality of ejector nozzles which decreases the turbine back pressure.

In accordance with preferred embodiments of the present invention, these objects are obtained by an exhaust gas turbocharger including a turbine housing with a turbine chamber, an exhaust housing portion, an exhaust gas inlet and a turbine wheel rotatably mounted in the turbine chamber and rotatably responsive to exhaust gas flow from the exhaust gas inlet. An outlet insert is also provided and is rigidly attached to the exhaust housing portion and extends toward the turbine chamber thereby defining a bypass chamber and providing an exhaust gas outlet. A bypass flow passage which fluidly connects the exhaust gas inlet with the bypass chamber is also provided. In one embodiment, the outlet insert includes a plurality of ejector nozzles for directing bypassed flow from the bypass chamber to the exhaust gas outlet at a predetermined pitch angle toward the center line of the exhaust gas outlet and at a predetermined yaw angle tangent to the exhaust gas outlet. In this manner, the direction of the bypassed flow is controlled as it re-enters the main exhaust flow. In one preferred embodiment, the pitch angle is 17 degrees and the yaw angle is also 17 degrees. In another embodiment, an ejector nozzle ring with a plurality of ejector nozzles is provided between the turbine chamber and an outlet insert. The nozzle ring directs the bypassed flow from the bypass chamber to the exhaust gas outlet at predetermined pitch and yaw angles. In another preferred embodiment, the nozzle ring is made from a metal stamping and has pitch and yaw angles of 17 degrees.

These and other objects, features and advantages of the present invention will become more apparent from the following detailed description of the preferred embodiments of the invention when viewed in conjunction with the accompanying drawings.

DETAILED DESCRIPTION OF THE PREFERRED EMBODIMENTS

Figure 1:
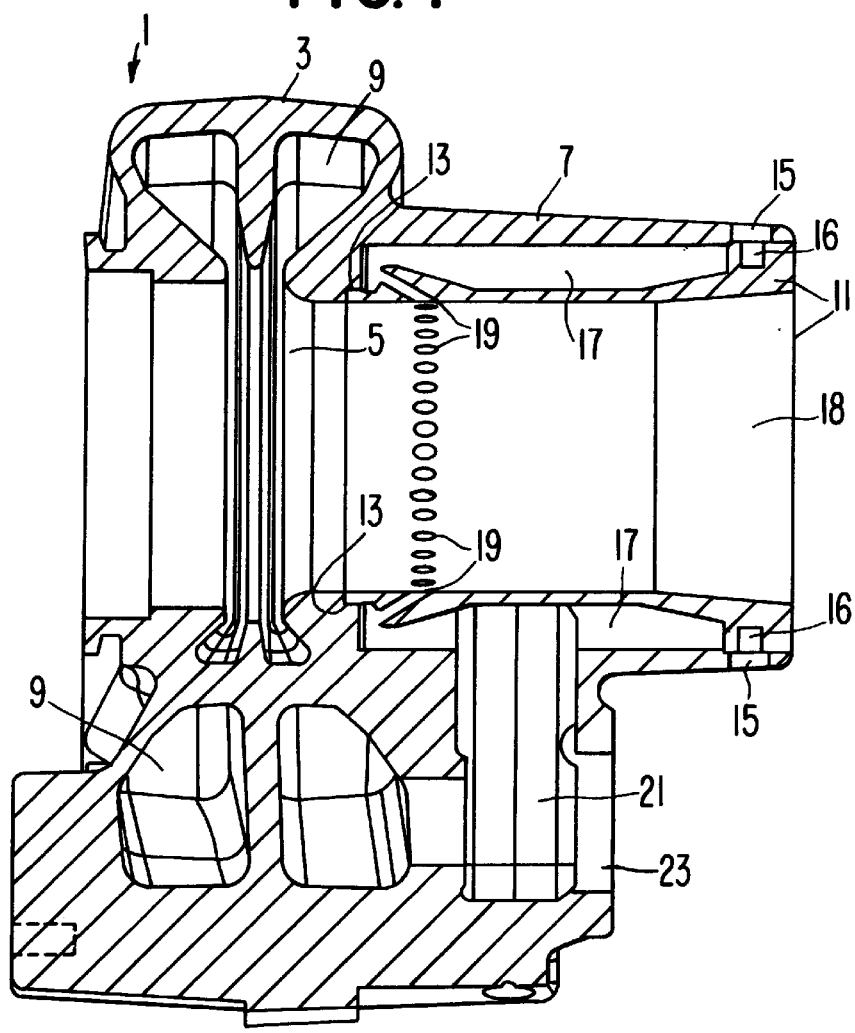
FIG. 1 is a cross-sectional view of a part of a turbocharger in accordance with one embodiment of the present invention.

FIG. 1 is a sectional illustration of part of a wastegated turbocharger 1 in accordance with one embodiment of the present invention which provides an effective ejector design that will reduce turbine outlet pressure. Although the following discussions disclose various embodiments of the present invention in detail, the present invention may also be practiced in alternative embodiments. The turbocharger 1 includes a turbine housing 3 which is similar to turbine housings known in the art. The turbine housing 3 includes a turbine chamber 5, an exhaust housing portion 7 and an exhaust gas inlet 9. The turbine chamber 5 encases a rotatably mounted turbine wheel (not shown) and exhaust gases from an engine (not shown) enters the turbine chamber 5 from the exhaust gas inlet 9 and causes the turbine wheel to rotate. Also in this particular embodiment, an outlet insert 11 is provided which increases the performance of the engine as the bypassed exhaust gas re-enters the main exhaust flow. As will be discussed in detail hereinbelow, this increase in engine performance is attained by having the bypassed exhaust gas flow re-enter the main exhaust flow through a plurality of ejector nozzles 19 that minimize the disturbance of the main exhaust flow and actually decreases the turbine back pressure.

Again, as an example of one embodiment of the present invention, FIG. 1 illustrates a turbocharger 1 including an outlet insert 11 rigidly attached within the exhaust housing portion 7 at one end by fasteners such as set screws (not shown) at the attachment holes 15 and 16. The outlet insert 11 extends generally toward the turbine chamber 5 thereby defining a bypass chamber 17 and provides an exhaust gas outlet 18 through which the main exhaust flows. The turbine chamber 5 includes a positioning step chamber 13 that receives and positions the other end of the outlet insert 11. In this embodiment, the outlet insert 11 also includes a plurality of radially positioned ejector nozzles 19 which connect the bypass chamber 17 with the exhaust gas outlet 18 such that they are in fluid communication with one another. In the embodiment illustrated, 34 ejector nozzles 19 are provided on the outlet insert 11 as an example only. The bypass chamber 17 is in fluid communication with the exhaust gas inlet 9 by a way of a bypass flow passage 21. A valve (not shown) may also be provided on the bypass flow passage at valve seat location 23 in order to control the amount of exhaust gas being diverted from the exhaust gas inlet 9.

Figure 2:
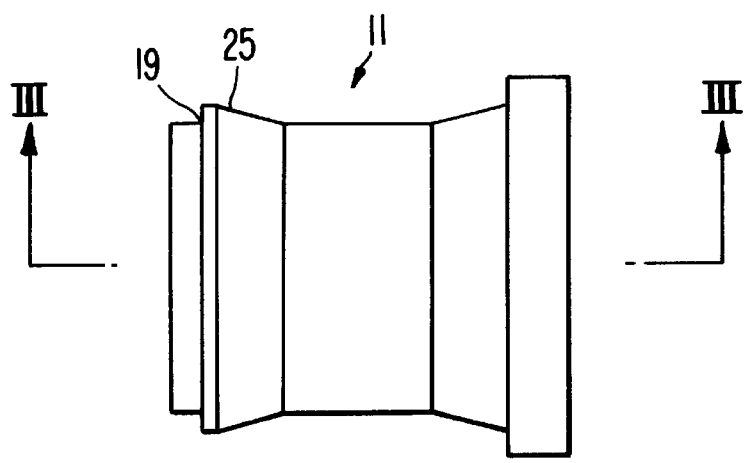
FIG. 2 is a top plan view of exhaust outlet insert illustrated in FIG. 1.
Figure 3:
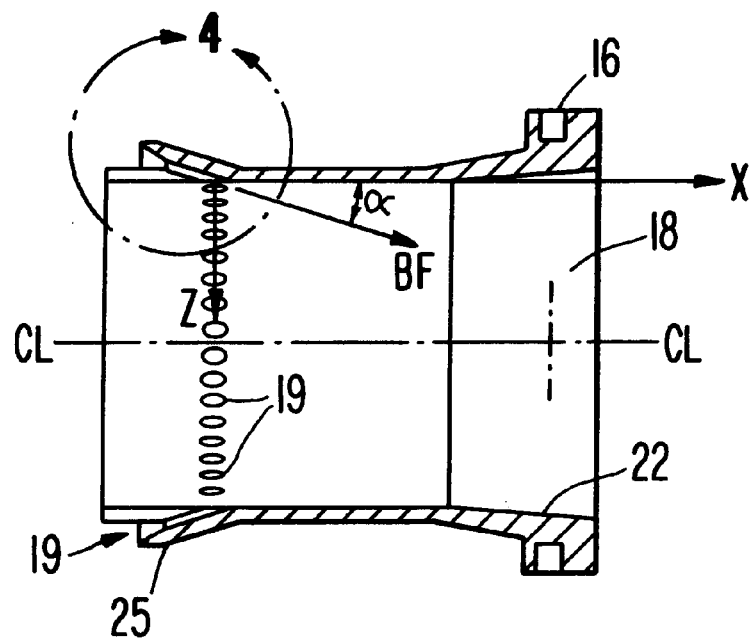
FIG. 3 is a cross-sectional view of the exhaust outlet insert illustrated in FIG. 2 as viewed from the cross section III—III showing the pitch angle.

FIG. 2 is a top plan view of the outlet insert 11 of FIG. 1 detached from the turbine housing which clearly shows the general exterior features of the outlet insert 11, which in the present embodiment, includes an annular raised portion 25. FIG. 3 is a sectional illustration of the outlet insert 11 as viewed from the cross-section III—III on FIG. 2. The diameter of the outlet insert 11 depends on the desired size of the exhaust gas outlet 18 which in turn, is dependent on the size and capacity of the turbocharger. As an example only, the outlet insert 11 may have a radius of 30 mm in certain turbocharger applications such as the one discussed in the present embodiment.

As can be clearly seen in FIG. 3, a plurality of ejector jets 19 are provided on the outlet insert 11 and are formed within the annular raised portion 25. The direction of the bypassed flow which re-enters the main exhaust flow is indicated by arrow BF. As can be seen, the ejector nozzle 19 is formed with a pitch angle $\alpha$ such that the bypassed flow re-enters the main exhaust flow at the pitch angle $\alpha$ which can be defined as the angle between the direction of the bypassed flow and the center line of the exhaust gas outlet 18 or any parallel line thereto, such as the x-axis. Thus, in FIG. 3, the pitch angle $\alpha$ is the angle between the direction BF and the x-axis in the plane formed by the x-axis and the z-axis. It has been found that a pitch angle $\alpha$ in a range of 5 to 30 degrees may provide a significant ejector effect. However, through extensive experimentation, it has been found that a pitch angle $\alpha$ of 17 degrees is particularly effective in attaining the desired ejector effect in the present embodiment.

As also illustrated in FIG. 3, the outlet insert 11 may include an optional diffuser 22 with an expanding conical shape which allows further control of the turbine outlet pressure by allowing the exhaust flow to expand. It has been found that a diffuser 22 with an expanding conical shape of 11 degrees is effective in further reducing the turbine back pressure. However, it should be appreciated by those skilled in the art that other expanding conical shapes with different angles may also be used to achieve the disclosed advantage.

Figure 4:
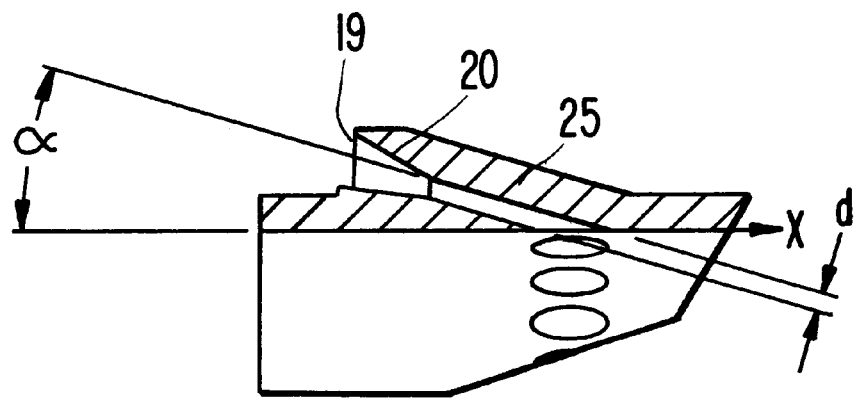
FIG. 4 is an enlarged view of the circled area IV of the exhaust outlet insert illustrated in FIG. 3.

FIG. 4 is an enlarged view of the encircled area "4" of FIG. 3 clearly showing various dimensions of a preferred ejector nozzle in accordance with the present invention. Each ejector nozzle may be circular with a diameter "d" and also include a conical portion 20 where the bypassed exhaust flow enters the ejector nozzle 19. As an example only, the diameter d may be 3.43 mm and the conical portion 20 may be shaped as a 20 degree cone.

Figure 5:
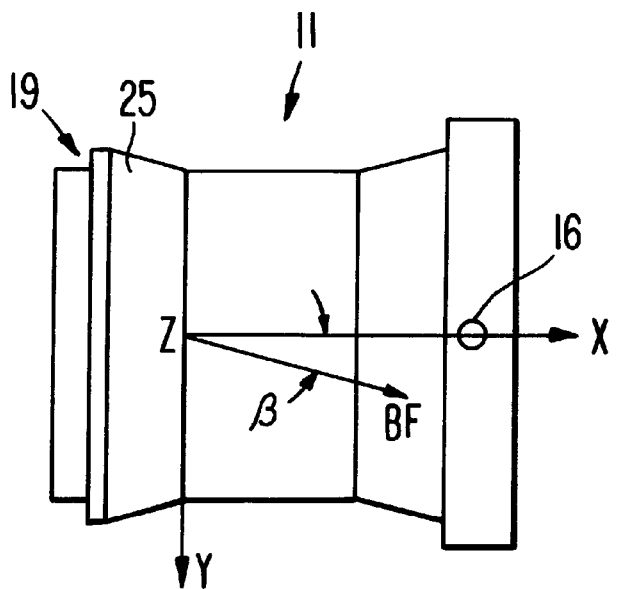
FIG. 5 is a top plan view of the exhaust outlet insert of FIG. 2 showing the yaw angle.

FIG. 5 shows the top plan view of the exhaust outlet insert 11 and the general direction of the bypassed flow is illustrated again by arrow BF. As clearly illustrated, the ejector jets 19 in accordance with this embodiment of the present invention are also designed so that the bypassed flow re-enters the main exhaust flow at a yaw angle $\beta$, in addition to the pitch angle $\alpha$. The yaw angle $\beta$ can be defined as the angle between the tangential component of the re-entering bypassed gas and the centerline of exhaust gas outlet 18. Thus, in FIG. 5, the yaw angle $\beta$ is the angle between BF and the x-axis in the plane formed by the x-axis and the y-axis. A yaw angle $\beta$ in the range of 5 to 30 degrees has been found to provide a significant ejector effect. Again, through extensive experimentation, it has been determined that a yaw angle $\beta$ of 17 degrees provided the desired ejector effect in the present embodiment.

Of course, it should be recognized that the specific details of the embodiment disclosed above may be easily modified in alternative embodiments to meet different requirements. For example, different numbers of ejector nozzles may be provided including 34, 37 or 44 ejector nozzles. Other ejector nozzle diameters or even differing nozzle shapes such as oval, rectangular or even square nozzles may also be used depending on the specific requirements of the turbocharger application. However, in contrast to prior annular designs which have relatively large openings and cross sectional areas, the ejector nozzles in accordance with the present invention have relatively small openings and cross sectional areas. In addition, the present invention may also be modified such that the conical portion may be of a different size or even be eliminated. Furthermore, other pitch and yaw angles may also be used to attain the desired ejector effect in any given application of a wastegated turbocharger.

Figure 6:
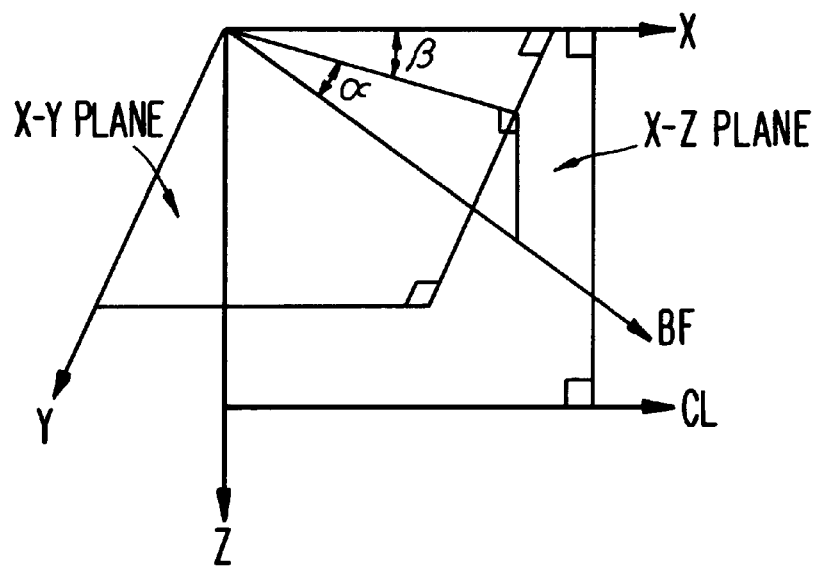
FIG. 6 is a geometric view illustrating the pitch angle and the yaw angle of the bypassed flow in accordance with one embodiment of the present invention.

For further clarification, the flow direction BF of the bypassed flow re-entering the main exhaust flow from an ejector jet in accordance with the present invention is geometrically illustrated in FIG. 6. The x-axis is defined to be parallel to the center line CL of the exhaust gas outlet 18 (not shown) which is also the center line of the main exhaust flow from the turbine. The y-axis, is defined as the tangent to the exhaust gas outlet 18 while the x-y plane is defined by the x-axis and while the x-z plane is defined by the x-axis and the z-axis as shown. The flow direction BF of the bypassed exhaust flow has x, y, and z components. The z-axis component of BF defines the pitch angle $\alpha$ which can be measured between BF and the x-y plane as indicated. The y-axis component of BF defines the yaw angle $\beta$ which can be measured between BF and the x-z plane. Thus, the bypassed exhaust gas re-enters the main exhaust flow from each of the ejector jets at the pitch angle $\alpha$ and the yaw angle $\beta$. As discussed previously, in one embodiment of the present invention, it has been found that a pitch angle $\alpha$ of 17 degrees and a yaw angle $\beta$ of 17 degrees provided a very efficient ejector jet geometry which effectively reduced the turbine pressure although other geometries may be used.

In laboratory experiments, substantial turbine outlet pressure reductions have been attained by practicing the present invention in embodiments which include an outlet insert with a plurality of ejector nozzles with the ejector jet geometry disclosed above. More specifically, extensive experiments were conducted using an exhaust inserts with 37 and 44 ejector nozzles, each nozzle having a circular diameter d of 3.43 mm with a conical portion 20 shaped as a 20 degree cone and directing the bypassed flow such that the bypassed flow re-enters the main flow at a pitch angle of 17 degrees and a yaw angle of also 17 degrees. In the 37 ejector nozzle embodiment, a diffuser was also provided to further reduce the turbine outlet pressure.

Figure 7:
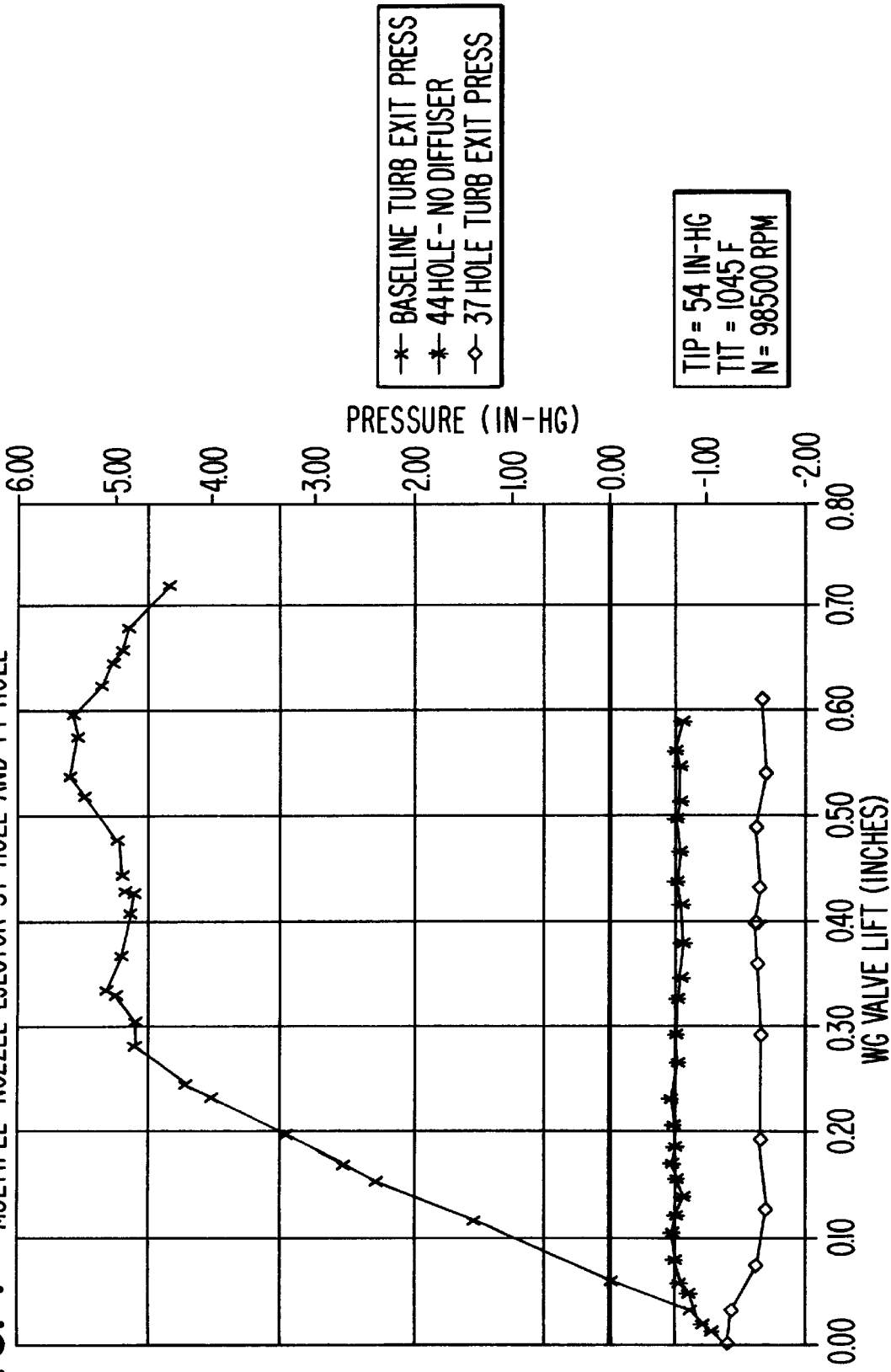
FIG. 7 is a graphical illustration of the performance gain realized by utilizing embodiments of the present invention.

These experimental results are illustrated in FIG. 7 which shows the turbine back (exit) pressures when the above noted embodiments were used as compared to turbine back pressure in conventional wastegated turbochargers. The vertical axis of FIG. 7 scales the turbine back (exit) pressures while the horizontal axis scales the wastegate (WG) valve lift. During the testing, the turbine inlet pressure (TIP) was held constant at 54 in-Hg and the turbine speed held constant at 98500 revolutions per minute (RPM). As can be clearly seen, the turbine outlet pressures of both of the ejector designs in accordance with the present invention were significantly less than the baseline turbine outlet pressure which had a conventional bypass design. In the 44 ejector nozzle design, a pressure reduction of about 6 in-Hg was attained in comparison to the baseline turbine outlet pressure. In the 37 ejector nozzle design which included a diffuser, a pressure reduction of about 7 in-Hg was attained in comparison to the baseline turbine outlet pressure. It should also be noted that by measuring the pressure reductions realized, it has also been found that in these embodiments of the present invention, the bypassed flow re-enters the main exhaust flow at nearly sonic speeds. And as clearly shown, the present invention attained pressure reductions far greater than the amount of pressure reduction realized in conventional and annular designs discussed previously. Thus, the present invention provides an effective ejector design that not only minimizes the disruption of the main exhaust flow as the bypassed flow re-enters the main exhaust flow, but will also actually reduce the turbine back pressure by creating an ejector effect thereby increasing engine performance and efficiency.

Figure 8:
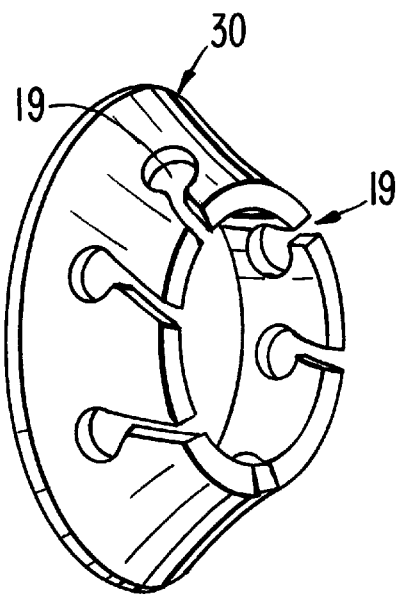
FIG. 8 is a simplified perspective view of an ejector nozzle ring in accordance with another embodiment of the present invention.

An alternative embodiment of the present invention is shown in FIG. 8 which can reduce the manufacturing costs of practicing the present invention. In this embodiment, a plurality of ejector nozzles 19 are formed on an ejector nozzle ring 30 which is separate from the outlet insert (not shown). The ejector nozzle ring 30 embodiment illustrated in FIG. 8 has a conical disk shape and includes, as an example only, six ejector nozzles 19 which are cut out from the ejector nozzle ring 30.

Figure 9:
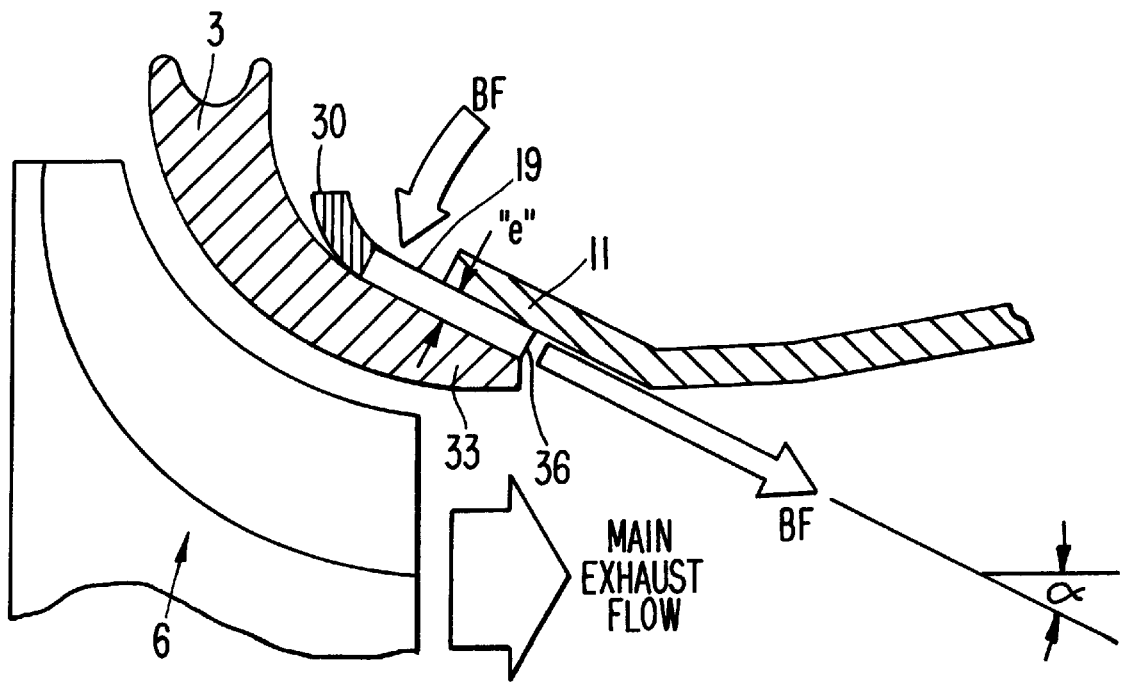
FIG. 9 is an enlarged sectional view showing the ejector nozzle ring in relation to the exhaust outlet insert in accordance with the embodiment of the present invention shown in FIG. 6.

FIG. 9 provides a clearer view of this embodiment of the present invention by illustrating an enlarged sectional view of the ejector nozzle ring 30 and how it is positioned. In this embodiment, the turbine chamber 5 which encloses a turbine wheel 6 includes a nozzle ring receiving portion 33. The outlet insert 11 is dimensioned such that when the outlet insert 11 is installed within the exhaust housing portion (not shown), there is a predetermined distance "e" between the nozzle ring receiving portion 33 and the outlet insert 11 thereby forming an annular nozzle ring receiving area generally indicated as 36. The ejector nozzle ring 30 is disposed in the nozzle ring receiving area 36 and may be fixedly positioned by the outlet insert 11. As illustrated in the present embodiment, the ejector nozzles 19 may be formed on the ejector nozzle ring 30 such that the bypassed exhaust flow re-enters the main exhaust flow at a predetermined pitch angle α and at a predetermined yaw angle 13 (not shown). And as discussed previously, a pitch angle α of 17 degrees and a yaw angle β of 17 degrees have been found to provide a very efficient ejector jet geometry which effectively reduced the turbine pressure.

Of course, in other embodiments, the ejector nozzle ring 30 may also be provided with much greater number of ejector nozzles such as 34, 37 or 44 nozzles. Furthermore, the shape of the ejector nozzles 19 are illustrated as an example only and should be understood to be only one embodiment of the present invention. As will be recognized by persons skilled in the art, this embodiment can reduce the manufacturing costs of the present invention since the ejector nozzle ring 30 and the ejector nozzles 19 thereon may be integrally stamped from flat sheet metal using well known manufacturing techniques which costs much less than forming the holes directly on the outlet insert 11. As will be also recognized, if the ejector nozzle ring 30 and the ejector nozzles 19 thereon are made from a metal stamping as illustrated in this embodiment, the ejector nozzles 19 will be formed by surfaces of the nozzle ring 30, the outlet insert 11 and the nozzle ring receiving portion 33. As a result, the ejector nozzles 19 in this embodiment will have a rectangular or square cross-sectional area rather than circular cross-sectional area disclosed in one of the prior embodiments. Of course, the nozzle ring 30 may be modified such that it provides more of the surfaces required to form the ejector nozzles instead of using the surfaces of the outlet insert 11 and the nozzle ring receiving portion 33. In addition, the present invention may also be practiced by combining the above disclosed embodiments by providing an ejector nozzle ring of a greater thickness and providing holes within the nozzle ring that form the ejector nozzles.

From the foregoing, it should now be apparent how the present invention provides an improved wastegated turbocharger including a plurality of ejector nozzles designed to minimize the increase in turbine back pressure by minimizing the disturbance of the main exhaust flow. Furthermore, it can be seen how the present invention provides an improved wastegated turbocharger where the bypassed exhaust flow re-enters the main exhaust flow passage through a plurality of ejector nozzles which decreases the turbine back pressure.

While various embodiments in accordance with the present invention have been shown and described, the present invention is not limited thereto. Various modifications, variations and additions will now become evident to persons skilled in the art. Therefore, the present invention is not limited to the details shown and described herein, but includes all such modifications, variations and additions that are encompassed within the scope of the appended claims.

Industrial Applicability

The present invention will find applicability in a wide range of engine applications that utilize wastegated turbochargers.

What is claimed is:

1. An exhaust gas turbocharger comprising:
   a turbine housing having a turbine chamber, an exhaust housing portion, and an exhaust gas inlet communicating with said turbine chamber;
   a turbine wheel rotatably mounted in said turbine chamber, said turbine wheel being rotatably responsive to exhaust gas flow from said exhaust gas inlet across said turbine wheel;
   an outlet insert positioned within said exhaust housing portion and extending toward said turbine chamber thereby providing an exhaust gas outlet and defining a bypass chamber, an end of said outlet insert being spaced at a predetermined distance from said turbine chamber thereby forming an annular nozzle ring receiving area;
   an ejector nozzle ring disposed in said annular nozzle ring receiving area, said ejector nozzle ring including a plurality of ejector nozzles for directing exhaust flow from said bypass chamber to said exhaust gas outlet, each of said plurality of ejector nozzles including a substantially tubular passage having a width dimension which is substantially equal to a height dimension;
   a bypass flow passage fluidly connecting said exhaust gas inlet with said bypass chamber; and
   a valve positioned to control flow through said bypass flow path.

2. An exhaust gas turbocharger of claim 1, wherein said plurality of ejector nozzles directs said exhaust flow from said bypass chamber at a predetermined pitch angle toward the center line of said exhaust gas outlet and at a predetermined yaw angle tangential to said exhaust gas outlet.

3. An exhaust gas turbocharger of claim 2, wherein said predetermined pitch angle is between 5 and 30 degrees.

4. An exhaust gas turbocharger of claim 3, wherein said predetermined pitch angle is substantially 17 degrees.

5. An exhaust gas turbocharger of claim 2, wherein said predetermined yaw angle is between 5 and 30 degrees.

6. An exhaust gas turbocharger of claim 5, wherein said predetermined yaw angle is substantially 17 degrees.

7. An exhaust gas turbocharger of claim 2, wherein said ejector nozzle ring includes at least six ejector nozzles circumferentially positioned around said ejector nozzle ring.

8. An exhaust gas turbocharger of claim 7, wherein said ejector nozzle ring includes one of thirty-four, thirty-seven and forty-four passages circumferentially positioned around said ejector nozzle ring.

9. An exhaust gas turbocharger of claim 2, wherein said ejector nozzle ring is formed from a metal stamping.

\* \* \* \* \*